(12) United States Patent
Mohrlock et al.

(10) Patent No.: US 9,469,174 B2
(45) Date of Patent: Oct. 18, 2016

(54) WHEEL SUSPENSION FOR A MOTOR VEHICLE

(71) Applicant: AUDI AG, Ingolstadt (DE)

(72) Inventors: Dominik Mohrlock, Buxheim (DE);
Ruben Goldberg, Ingolstadt (DE);
Andreas Schindler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,017

(22) PCT Filed: Jan. 16, 2014

(86) PCT No.: PCT/EP2014/000102
§ 371 (c)(1),
(2) Date: Aug. 14, 2015

(87) PCT Pub. No.: WO2014/124721
PCT Pub. Date: Aug. 21, 2014

(65) Prior Publication Data
US 2015/0375590 A1    Dec. 31, 2015

(30) Foreign Application Priority Data

Feb. 16, 2013   (DE) .................. 10 2013 002 710

(51) Int. Cl.
*B60G 3/24*       (2006.01)
*B60G 3/20*       (2006.01)
(Continued)

(52) U.S. Cl.
CPC . *B60G 3/24* (2013.01); *B60G 3/20* (2013.01); *B60G 7/02* (2013.01); *B60G 11/181* (2013.01);
(Continued)

(58) Field of Classification Search
CPC ...... B60G 3/24; B60G 7/02; B60G 21/0555; B60G 11/20; B60G 3/20; B60G 11/181; B60G 2200/18; B60G 2204/422; B60G 2202/132; B60G 2202/442; B60G 2202/42; B60G 2204/143; B60G 2204/122
See application file for complete search history.

(56) References Cited

U.S. PATENT DOCUMENTS 3,652,104 A * 3/1972 Chabek ................ B60G 3/26
280/124.137
4,883,289 A * 11/1989 Sardou .................. B29C 70/205
267/273

(Continued)

FOREIGN PATENT DOCUMENTS

DE        40 15 777        11/1990
DE       103 30 894         2/2005
(Continued)

OTHER PUBLICATIONS

International Search Report issued by the European Patent Office in International Application PCT/EP2014/000102 on May 9, 2014.

*Primary Examiner* — Darlene P Condra
(74) *Attorney, Agent, or Firm* — Henry M. Feiereisen LLC.

(57) ABSTRACT

The invention relates to a wheel suspension for a motor vehicle, said wheel suspension having a multi-link assembly (21) of links that are hinged to the vehicle body, in particular to a subframe (1) of the vehicle body, and to a hub carrier (23), and having a rotary actuator (27) for active chassis control, said rotary actuator having a motor-gear unit (29) with which torques can be transmitted, via at least one torsion bar (31), as adjusting forces to said multi-link assembly (21). According to the invention, at least one of the links (14, 16) of the multi-link assembly (21) limits, in the longitudinal direction (x) of the vehicle towards the front or towards the back, a free space (39) in which said motor-gear unit (29) of the rotary actuator (27) is at least partially arranged.

17 Claims, 4 Drawing Sheets

(51) Int. Cl.
*B60G 7/02* (2006.01)
*B60G 11/18* (2006.01)
*B60G 11/20* (2006.01)
*B60G 21/055* (2006.01)

(52) U.S. Cl.
CPC ........... B60G 11/20 (2013.01); B60G 21/0555 (2013.01); *B60G 2200/18* (2013.01); *B60G 2200/184* (2013.01); *B60G 2202/132* (2013.01); *B60G 2202/32* (2013.01); *B60G 2202/42* (2013.01); *B60G 2202/442* (2013.01); *B60G 2204/122* (2013.01); *B60G 2204/1224* (2013.01); *B60G 2204/143* (2013.01); *B60G 2204/422* (2013.01)

(56) References Cited

U.S. PATENT DOCUMENTS

| | | | | |
|---|---|---|---|---|
| 5,839,741 | A * | 11/1998 | Heyring | B60G 21/04 280/124.106 |
| 5,927,737 | A * | 7/1999 | Hoefer | B60G 7/04 267/273 |
| 8,967,670 | B2 | 3/2015 | Mohrlock et al. | |
| 2002/0116104 | A1 | 8/2002 | Kawashima et al. | |
| 2005/0073126 | A1* | 4/2005 | Seki | B60G 3/20 280/124.152 |
| 2005/0275181 | A1* | 12/2005 | MacIsaac | B60G 3/01 280/124.103 |
| 2006/0197301 | A1* | 9/2006 | Kunert | B60G 3/20 280/124.165 |
| 2010/0019465 | A1* | 1/2010 | Yuta | B60G 3/20 280/86.758 |
| 2010/0066040 | A1 | 3/2010 | Suyama | |
| 2011/0278811 | A1* | 11/2011 | Ohletz | B60G 11/183 280/124.106 |
| 2012/0280465 | A1* | 11/2012 | Meitinger | B60G 3/20 280/86.751 |
| 2013/0009375 | A1* | 1/2013 | Tanaka | B60G 7/02 280/124.109 |
| 2013/0099455 | A1 | 4/2013 | Beringer et al. | |
| 2014/0156143 | A1 | 6/2014 | Evangelou et al. | |

FOREIGN PATENT DOCUMENTS

| | | |
|---|---|---|
| DE | 102008045787 | 3/2009 |
| DE | 102009005898 | 7/2010 |
| DE | 102009052877 | 5/2011 |
| DE | 102009058972 | 6/2011 |
| DE | 102010061154 | 6/2012 |
| EP | 1 184 214 | 3/2002 |
| EP | 1 184 215 | 3/2002 |
| JP | 2007237956 A * | 9/2007 |
| JP | 2008-168891 | 7/2008 |
| JP | 2009-029257 | 2/2009 |
| WO | WO 03/008212 | 1/2003 |
| WO | WO 2009/069793 | 6/2009 |
| WO | WO 2012/025705 | 3/2012 |

* cited by examiner

WHEEL SUSPENSION FOR A MOTOR VEHICLE

CROSS-REFERENCES TO RELATED APPLICATIONS

This application is the U.S. National Stage of International Application No. PCT/EP2014/000102, filed Jan. 16, 2014, which designated the United States and has been published as International Publication No. WO 2014/124721 and which claims the priority of German Patent Application, Serial No. 102013002710.1 filed Feb. 16, 2013, pursuant to 35 U.S.C. 119(a)-(d).

BACKGROUND OF THE INVENTION

The invention relates to a wheel suspension for a motor vehicle, in particular for a vehicle rear axle with non-steered vehicle wheels.

In an active suspension control, each wheel suspension of a vehicle axle, in particular a rear axle, can have a rotary actuator. Depending on activation, the two rotary actuators of the vehicle axle can be used to modify the ride height and/or to compensate pitch and roll movements of the vehicle.

DE 10 2009 052 877 A1 discloses a generic suspension system for a motor vehicle, in which the vehicle body, in particular a vehicle-body-side subframe, is articulated for rotation via links to a wheel carrier. In addition, provision is made for a rotary actuator for an active suspension control which includes a motor-gear unit by which the torques can be transmitted via at least one torsion bar as actuating forces upon the multi-link assembly.

The rotary actuator is arranged with its torsion bar in the vehicle transverse direction. When a transverse arrangement of the torsion bar in front of the rear axle is involved, the tank volume of the motor vehicle has to be reduced for space reasons. When a transverse arrangement behind the rear axle is involved, there is a space conflict with the spare wheel well. In addition a transverse arrangement above the rear axle is conceivable in which, however, a height dimension chain in the vehicle body shell is considerably larger so that the loading floor or the interior is restricted accordingly. Extending below the rear axle on the other hand is the exhaust system and/or cardan shafts including transmission, which conflict with a transverse arrangement of the rotary actuators. Generally, the space-intensive motor-gear unit of the rotary actuator leads to package problems in the wheel suspension.

EP 1 184 214 A2 discloses a further wheel suspension in which the motor-gear unit of the rotary actuator is arranged coaxially to the torsion bar, which extends in the vehicle longitudinal direction.

SUMMARY OF THE INVENTION

The object of the invention is to provide a wheel suspension for a motor vehicle to reduce package problems in the vehicle axle despite use of an active suspension control.

The object is achieved by a wheel suspension for a motor vehicle, including a multi-link assembly of links, which are articulated to the vehicle body, in particular to a subframe of the vehicle body, and to a wheel carrier, and a rotary actuator for an active suspension control, including a motor-gear unit, with which the torques can be transmitted via a torsion bar as actuating forces onto the multi-link assembly, wherein at least one of the links of the multi-link assembly limits in the vehicle longitudinal direction towards the front or towards the rear a free space, in which at least in part, the motor-gear unit of the rotary actuator is arranged.

Advantageous refinements of the invention are disclosed in the dependent claims.

The invention is based on the fact that an immediate arrangement of the rotary actuator on the subframe of the vehicle oftentimes leads to package problems. Against this background, a free space is provided in accordance with the invention directly in the link assembly between the subframe and the wheel carrier for arrangement, at least in part, of the space-intensive motor-gear unit of the rotary actuator. The free space for the motor-gear unit is limited by at least one of the links of the multi-link assembly in the vehicle longitudinal direction forwards or rearwards.

Preferably, the free space for the motor-gear unit of the rotary actuator is limited in the vehicle longitudinal direction between a first link and a second link forwards and rearwards. The first and second links may be lower links of a five-link assembly. In such a multi-link assembly, the links can be arranged in an upper link plane in a lower link plane. Correspondingly, the free space for the motor-gear unit can be arranged particularly preferred between two links in the lower link plane.

The torsion bar actuatable by the motor-gear unit can support an output lever, which is articulated via a coupling rod to one of the links. In this way, the torques generated in the motor-gear unit can be transmitted via the load path motor/gear/torsion bar/output lever/coupling rod/link/vehicle wheel ultimately as linear actuating forces on the vehicle wheel. In the case of the above-mentioned five-link assembly, the output lever and the coupling rod can engage upon a link of the upper link plane and arranged below this upper link.

The free space for the motor-gear unit can be limited upwards by at least one upper link, which is, for example, acted upon by actuating forces via the rotary actuator. Viewed in the vehicle longitudinal direction, this upper link can be arranged between the first lower link and the second lower link.

For space reasons, it is preferred when the motor-engine unit of the rotary actuator, at least the reduction gear thereof, is arranged in coaxial relationship to the torsion bar. The torsion bar can additionally be aligned in the vehicle longitudinal direction together with the motor-gear unit. In this case, the output lever which extends at a right angle from the torsion bar is able to project into the free space for the motor-gear unit. It is particularly preferred, when the torsion bar of the rotary actuator can be arranged together with the coaxially arranged gear below the subframe longitudinal member and aligned with the course thereof.

According to a further embodiment, the motor of the rotary actuator can be arranged not coaxial, but rather arranged at a radial distance to the torsion bar. The motor may also be in driving relationship via an intermediate gear upon the transmission gear coaxial to the torsion bar. In this way, the motor, in particular an electric motor, can be positioned independently of the transmission gear, depending on space requirements. In particular such a motor, spatially separated from the transmission gear can preferably be arranged in the afore-mentioned free space of the multi-link assembly.

In a particularly compact construction of the multi-link assembly, the coupling rod can extend vertically upwards and be connected via an articulated connection with the upper link of the multi-link assembly. The articulated connection between the coupling rod and the upper link can, in particular in the compressed state of the vehicle, be arranged in the vehicle transverse direction outside of a vehicle longitudinal member by a transverse clearance. The upper link can extend in the vertical direction below the vehicle longitudinal member. For providing a vertical clearance for the vehicle longitudinal member, the upper link can be curved downwards, that is with arc sections converging at a lower apex point. The apex point may be spaced by a vertical clearance from the vehicle longitudinal member in the compressed state of the vehicle.

The provision of the intermediate gear is able to furthermore effect a greater overall transmission ratio between the electric motor and the torsion bar. The electric motors can therefore be designed smaller and more lightweight. As a result, the electric motor can be configured extremely compact and thus space-saving. Preferably, the transmission gear in coaxial relationship to the torsion bar and the motor of the motor-gear unit spaced therefrom, can each be arranged in individual housings. The intermediate gear may be, by way of example, a belt drive or a spur gear drive to produce the required radial offset between the motor and the torsion bar.

The advantageous configurations and/or refinements of the invention, as described above and set forth in the dependent claims, can—except for example in the cases of clear dependencies or incompatible alternatives—be used individually or also in any combination with each other.

BRIEF DESCRIPTION OF THE DRAWING

The invention and its advantageous configurations and refinements and their advantages are explained in more detail with reference to drawings.

It is shown in.

DETAILED DESCRIPTION OF PREFERRED EMBODIMENTS

Figure 1:
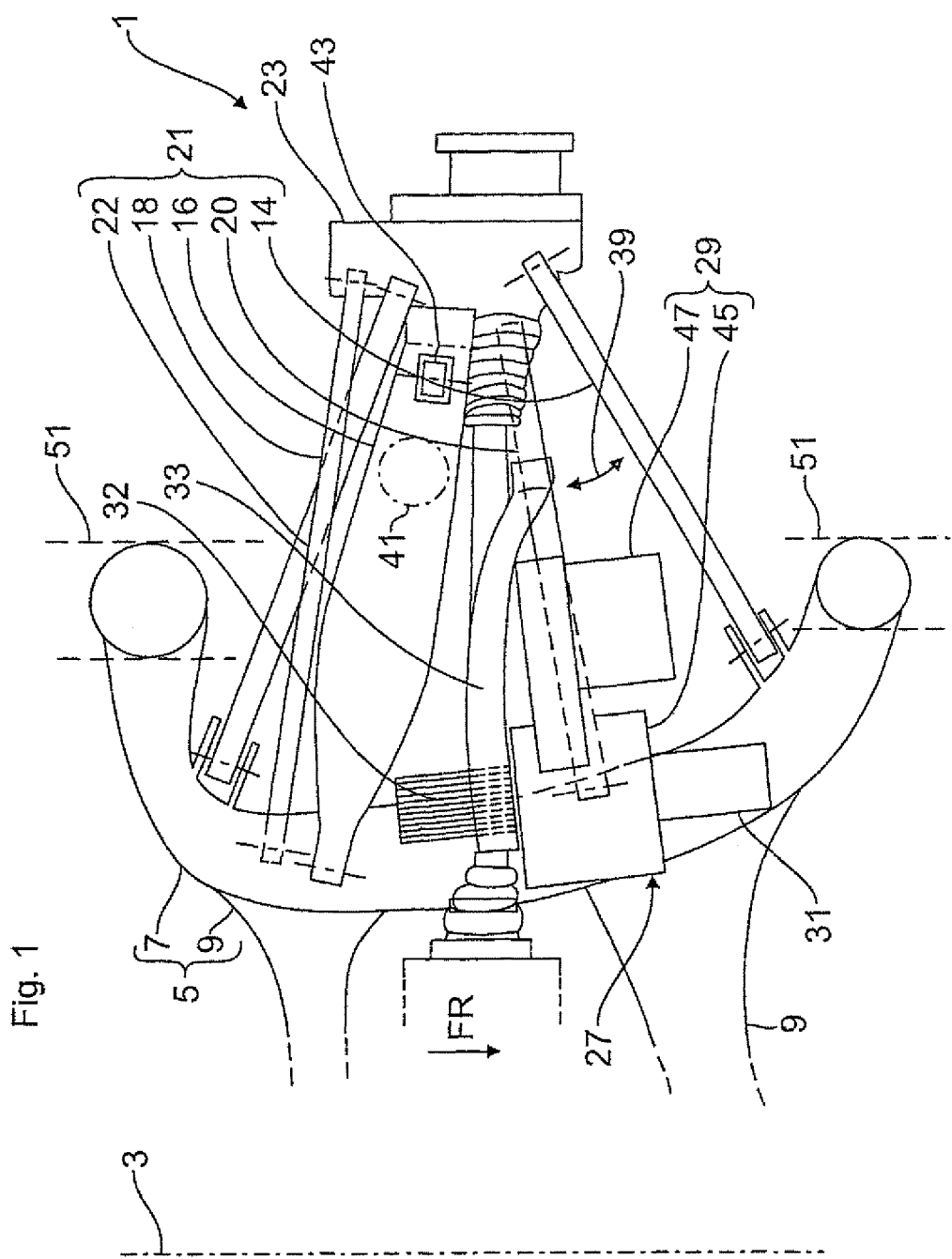
FIG. 1 a partial bottom view of the multi-link assembly of the wheel suspension.

FIG. 1 illustrates a partial bottom view of a rear axle 1 for a motor vehicle, described only insofar as it is necessary for the understanding of the invention. The rear axle 1 is configured with respect to a vehicle longitudinal center plane 3 in mirror symmetry. The rear axle 1 includes a subframe 5, which is composed of longitudinal members 7 as well as front and rear cross members 9. The subframe 5 is attached in a manner known per se on a vehicle body shell. Articulated to the longitudinal member 7 of the subframe 5 are lower links 14, 16, 18 and upper links 20, 22 for the wheel suspension in spatially offset arrangement via link bearings not shown in detail. The links 14 to 22 extend in the vehicle transverse direction y to the outside up to the wheel carrier 23 which carries a not shown rear wheel of the motor vehicle. In the present exemplary embodiment, the rear wheel is driven by an articulated shaft 25, which is guided in a not shown rear-axle differential, suspended on the subframe 5.

Figure 2:
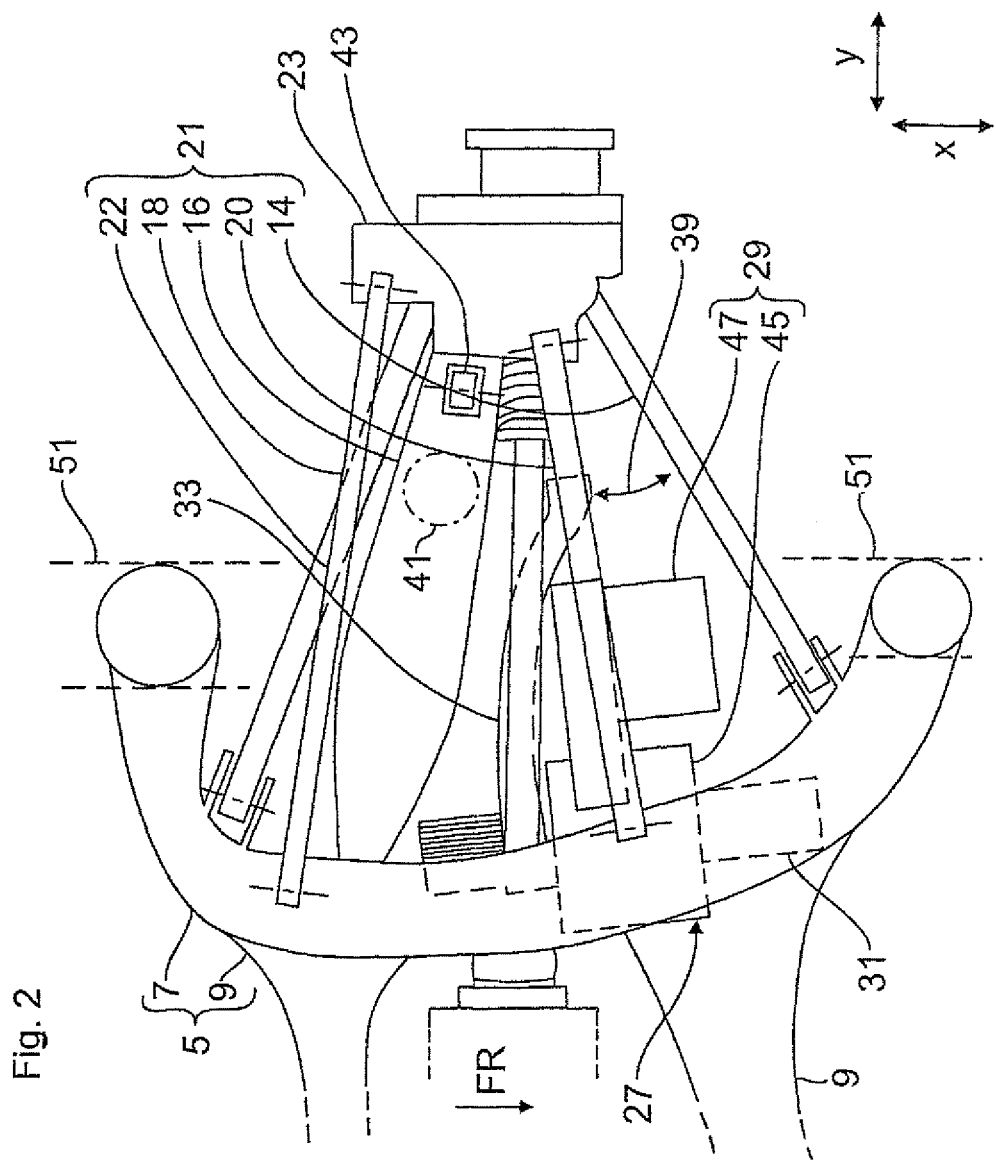
FIG. 2 a partial top view of the multi-link assembly of the wheel suspension.

As is further apparent from FIGS. 1 and 2, a rotary actuator 27 is provided for an active suspension control on the subframe longitudinal member 7. The rotary actuator 27 includes a motor-gear unit 29 which is connected in driving relationship, with a torsion bar 31. The torsion bar is connected in a force-transmitting manner via an indicated spline 32 with an output lever 33 which is in an articulated connection 37 via a coupling rod 35 (FIG. 3) with an upper lever 20 of the multi-link assembly 21.

The front lower first link 14 in the travel direction FR and the lower second link 16 arranged there behind diverge in the vehicle transverse direction y inwardly in a wedge-shaped manner, thereby forming a free space 39 into which part of the motor-gear unit 29 of the rotary actuator 27 projects. Supported on the second lower link 16 are, as shown in FIGS. 1 and 2, an indicated support spring 41 and an indicated telescoping shock absorber 43.

According to the Figures, the motor-gear unit 29 has a transmission gear 45 in coaxial relationship to the torsion bar 47 and an electric motor 47 in spaced-apart relationship to the torsion bar 31 at a radial offset r (FIG. 3) and in driving relationship with the transmission gear 45 via an intermediate gear 49. The housing of the transmission gear 45 of the rotary actuator 27 is fastened in a manner not further shown rigidly to the subframe longitudinal member 7, that is in such a manner that the torsion bar 31 of the rotary actuator 27 is aligned with the arcuate course of the subframe longitudinal member 7. The entire rotary actuator 27 is hereby positioned below the subframe longitudinal member 7 and below the articulated shaft 25. Starting from the transmission gear 45, the intermediate gear 49 projects hereby together with the electric motor 47 completely into the free space 39 between the two lower links 14, 16.

Figure 4:
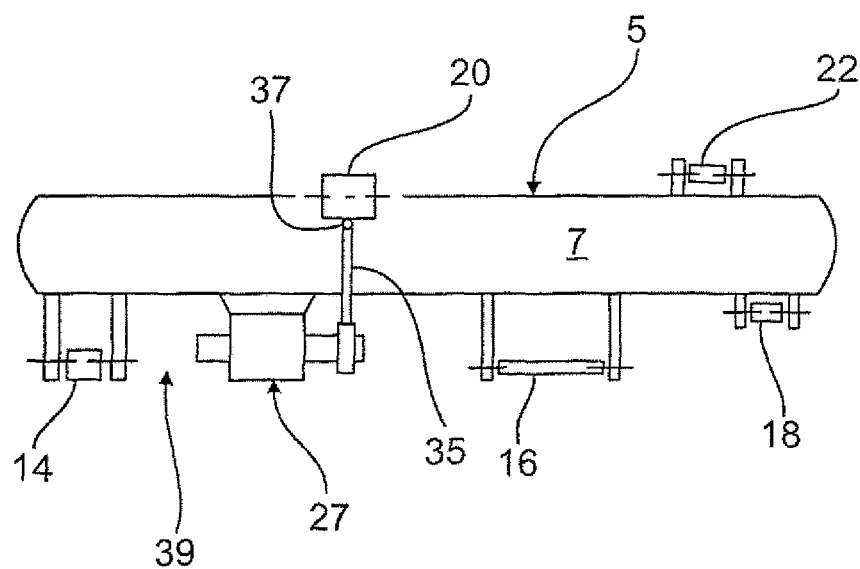
FIG. 4 a view in the vehicle transverse direction from outside of the articulated connections of the links to a subframe longitudinal member and the arrangement of the rotary actuator in the multi-link assembly.

The free space 39 between the two lower links 14, 16 is limited in accordance with FIG. 4 in the vertical direction z upwards by the upper link 20 of the multi-link assembly 21. In FIG. 4, the attachment points of the links to the subframe longitudinal member 7 and the positioning of the rotary actuator 27 in the free space 39 are shown by way of a perspective view. Accordingly, the two upper links 20, 22 are respectively arranged in an upper link plane, while the three lower links 14, 16, 18 are positioned in a lower link plane. Both the output lever 33 and the coupling rod 35 are hereby arranged approximately in alignment below the upper link 20, with the coupling rod 35 being oriented substantially vertically upwards.

Figure 3:
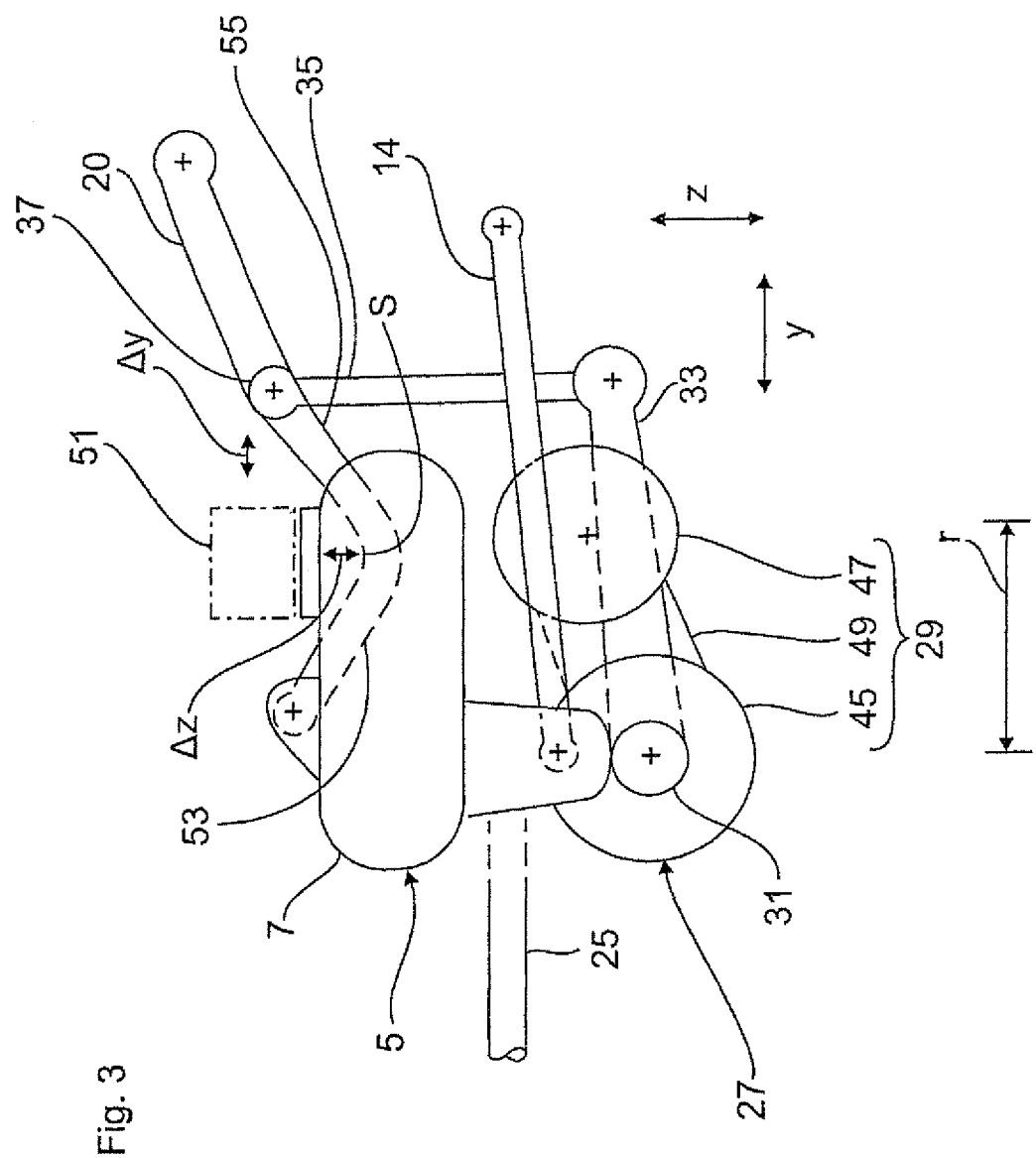
FIG. 3 a partial front view of the multi-link assembly of the wheel suspension.

FIG. 3 shows the wheel suspension in a compressed state of the motor vehicle. Accordingly, the articulated connection 37 between the coupling rod 35 and the front upper link 20 in the vehicle transverse direction y is arranged by a transverse clearance $\Delta y$ outside the vehicle longitudinal member 51. The link 20 extending below the vehicle longitudinal member 51 is curved in an approximately V-shaped manner downwards to provide a large enough vertical clearance $\Delta z$. The V-shaped curvature has, according to FIG. 3, two arc sections 53, 55 which converge at a lower apex point S. The lower apex point S of the link 20 is hereby spaced about the afore-mentioned vertical clearance $\Delta z$ from the underside of the vehicle longitudinal member 51.

In FIG. 2, the torsion bar 31 is pivoted with its rotation axis by a small angle from the vehicle longitudinal direction x. In contrast thereto, the torsion bar 31 is arranged in the exemplary embodiment of FIG. 3, with its rotation axis in alignment with the vehicle longitudinal direction x.

What is claimed is:

1. A wheel suspension for a motor vehicle, comprising:
   a multi-link assembly of links adapted for articulation to a vehicle body and a wheel carrier, at least one of the links of the multi-link assembly configured to limit a free space in a vehicle longitudinal direction towards a front or rear, wherein the multi-link assembly is articulated to a subframe of the vehicle body; and a rotary actuator configured for active suspension control, said rotary actuator including a torsion bar and a motor-gear unit configured to transmit a torque via the torsion bar as actuating force onto the multi-link assembly, said motor-gear unit being arranged, at least in part, in the free space, wherein the motor-gear unit is arranged beneath a longitudinal member of the subframe, with the torsion bar of the rotary actuator being aligned with a course of the longitudinal member.

2. The wheel suspension of claim 1, wherein the free space for the motor-gear unit of the rotary actuator is provided in the vehicle longitudinal direction between a first one of the links and a second one of the links of the multi-link assembly.

3. The wheel suspension of claim 2, wherein the multi-link assembly is a five-link assembly, said first and second links being lower links of the five-link assembly.

4. The wheel suspension of claim 1, further comprising an output lever attached to one of the links of the multi-link assembly.

5. The wheel suspension of claim 4, further comprising a coupling rod configured to connect the output lever to the one of the links of the multi-link assembly.

6. The wheel suspension of claim 5, wherein the one of the links of the multi-link assembly is an upper link, the output lever and the coupling rod being arranged below the upper link.

7. The wheel suspension of claim 4, wherein the one of the links of the multi-link assembly is an upper link.

8. The wheel suspension of claim 7, wherein the free space for the motor-gear unit is limited upwardly by the upper link.

9. The wheel suspension of claim 7, wherein the upper link is arranged in the vehicle longitudinal direction between a first lower one of the links and a second lower one of the links of the multi-link assembly.

10. The wheel suspension of claim 4, wherein the output lever is configured to project at a right angle from the torsion bar into the free space for the motor-gear unit.

11. The wheel suspension of claim 1, wherein the motor-gear unit of the rotary actuator is arranged in coaxial relationship to the torsion bar.

12. The wheel suspension of claim 1, wherein the motor-gear unit includes a transmission gear arranged in coaxial relationship to the torsion bar.

13. The wheel suspension of claim 1, wherein the torsion bar and the motor-gear unit are aligned in the vehicle longitudinal direction.

14. The wheel suspension of claim 1, wherein the motor-gear unit has a transmission gear and a motor which is arranged at a radial distance to the torsion rod, said motor being in driving relationship with the transmission gear.

15. The wheel suspension of claim 14, wherein the motor-gear unit has an intermediate gear, said motor being in driving relationship with the transmission gear via the intermediate gear.

16. The wheel suspension of claim 1, wherein the motor-gear unit has a motor which is arranged in the free space.

17. The wheel suspension of claim 1, wherein the rotary actuator is arranged with its rotation axis below an articulated shaft guided to a vehicle wheel as well as a wheel center.

* * * * *